United States Patent
Perentes et al.

(10) Patent No.: US 9,788,681 B2
(45) Date of Patent: Oct. 17, 2017

(54) PARAMETRIC RECIPES FOR PREPARING BEVERAGE WITH CAPSULES IN A CENTRIFUGAL BREWING SYSTEM

(71) Applicant: NESTEC S.A., Vevey (CH)

(72) Inventors: Alexandre Perentes, Pully (CH); Peter Siegrist, Jegenstorf (CH)

(73) Assignee: Nestec S.A., Vevey (CH)

( * ) Notice: Subject to any disclaimer, the term of this patent is extended or adjusted under 35 U.S.C. 154(b) by 234 days.

(21) Appl. No.: 14/652,273

(22) PCT Filed: Dec. 12, 2013

(86) PCT No.: PCT/EP2013/076448
§ 371 (c)(1),
(2) Date: Jun. 15, 2015

(87) PCT Pub. No.: WO2014/090965
PCT Pub. Date: Jun. 19, 2014

(65) Prior Publication Data
US 2015/0320254 A1     Nov. 12, 2015

(30) Foreign Application Priority Data

Dec. 13, 2012 (EP) .................................... 12197050

(51) Int. Cl.
*A47J 31/22* (2006.01)
*A23F 5/24* (2006.01)
*B65D 85/804* (2006.01)
*A47J 31/00* (2006.01)

(52) U.S. Cl.
CPC ................ *A47J 31/22* (2013.01); *A23F 5/24* (2013.01); *A47J 31/002* (2013.01); *B65D 85/8043* (2013.01)

(58) Field of Classification Search
CPC ..... B65D 85/8043; A47J 31/22; A47J 31/002; A23F 5/24
See application file for complete search history.

(56) References Cited

U.S. PATENT DOCUMENTS

2010/0239734 A1    9/2010  Yoakim et al.
2011/0189362 A1*   8/2011  Denisart .................. A47J 31/22
                                                          426/433

FOREIGN PATENT DOCUMENTS

| CN | 102196753 | 9/2011 |
| CN | 102264265 | 11/2011 |
| CN | 102595983 | 7/2012 |

(Continued)

OTHER PUBLICATIONS

Office Action issued in related Chinese Patent Application No. 201380072720.0 dated Apr. 5, 2017.

*Primary Examiner* — Erik Kashnikow
*Assistant Examiner* — C Smith
(74) *Attorney, Agent, or Firm* — K&L Gates LLP (57) ABSTRACT

The present invention relates to the preparation of a beverage by centrifugation of a capsule, by: Recognizing the type of the capsule inserted in the centrifuging brewing device, and/or its ingredients; Selecting accordingly a recipe comprising at least two sets of target values for parameters of the centrifuging brewing device, each set being associated to a specific condition; Controlling the parameters of the centrifuging brewing device so as to reach the target values of the set associated to the specific condition that is currently met.

18 Claims, 5 Drawing Sheets

(56) References Cited

FOREIGN PATENT DOCUMENTS

| WO | 2010026053 | 3/2010 |
|----|------------|--------|
| WO | 2011069830 | 6/2011 |
| WO | 2011141532 | 11/2011 |
| WO | 2011141535 | 11/2011 |

* cited by examiner

PARAMETRIC RECIPES FOR PREPARING BEVERAGE WITH CAPSULES IN A CENTRIFUGAL BREWING SYSTEM

CROSS REFERENCE TO RELATED APPLICATIONS

The present application is a National Stage of International Application No. PCT/EP2013/076448, filed on Dec. 12, 2013, which claims priority to European Patent Application No. 12197050.3, filed on Dec. 13, 2012, the entire contents of which are being incorporated herein by reference.

FIELD OF THE INVENTION

The present invention relates to the preparation of a beverage from a beverage substance contained in a capsule by passing a liquid through the substance using centrifugal forces.

In particular, the present invention relates to a method for preparing a beverage using recipes for adjusting precisely the extraction parameters to the type of capsules used to prepare said beverage.

BACKGROUND OF THE INVENTION

It exist systems for preparing beverages such as coffee by forcing a liquid through ingredients contained in the capsule using centrifugal forces.

WO 2008/148604 for example relates to a capsule for preparing a beverage or liquid food from a substance, in a centrifugal brewing unit, by passing water through the substance contained in the capsule by using brewing centrifugal forces comprising: an enclosure containing a predetermined dose of substance; opening means which opens under the centrifugal effect to allow the brewed liquid to leave the capsule. The capsule may also comprise means for engaging the capsule to external rotational driving means of a centrifugal brewing device wherein the engaging means are configured to offer a resistance to torque during rotation of the capsule for maintaining the capsule in a reference rotational position.

Thereby, the effect of centrifugal forces to brew coffee or prepare other food substances presents many advantages compared to the normal brewing methods using pressure pumps. For example, in traditional espresso or lungo coffee type brewing methods using a pressure pump, it is very difficult to master all the parameters which influence the quality of extraction of delivered coffee extract. These parameters are typically the pressure, the flow rate which decreases with the pressure, the compaction of the coffee powder which also influences the flow characteristics and which depends on the coffee ground particle size, the temperature, the water flow distribution and so on. In particular, it is not easy to vary the extraction pressure and flow rates because there are essentially determined by the static pressure deliverable by the pump, the resistance of the bed of coffee and the downstream filtering system.

For a centrifugal extraction, the rotating capsule is used as a centrifugal pump. The rotational speed thus determines the flow rate of the centrifuged liquid coming out of the capsule. The quality of the beverage to be prepared depends on the control, in particular, of the flow rate. In particular, the flow rate is influenced by two parameters: the rotational speed of the capsule in the device and the back-pressure exerted on the centrifuged liquid before it is projected out of the capsule.

Moreover, other parameters have influences on the quality of the delivered beverage, for example temperature of parts of the machine the beverage is in contact with.

Optimal parameters to apply to prepare a beverage vary greatly according to the type of ingredients to prepare and to the type of beverage to prepare. For instance, ideally, parameters should be set according to coffee powder, strength, aroma, taste, crema, volumes, etc.

WO2010/026053 relates to a controlled beverage production device using centrifugal forces comprising control means for controlling the flow rate, or respectively the pressure, of liquid to match a flow rate reference, or respectively a pressure reference, in a control loop by automatically adjusting the rotational speed of the driving means during the extraction phase of the beverage production depending on the measured flow rate, respectively the measured pressure. The control unit may, for instance, contain set points and values of the rotational speed of the driving means at different phases of the beverage preparation cycle. The capsule to be used can also be associated with a code containing information relative to one or more of the following parameters: flow rates, beverage volumes, speeds, beverage temperatures.

Therefore is a need for being able to provide beverages, (e.g. coffee) having different characteristics of intensity, taste, aroma, foam/crema in a system that is simple and versatile. There is still a need for proposing a new system for which the brewing parameters is better, more precisely, and more independently controlled for improving quality of the delivered coffee and providing an opportunity to deliver a wider range of coffee beverages of different volumes (e.g. 25, 40, 230 ml). There is still a need for proposing a solution to implement a reliable and precise solution for managing all these parameters and their variations, during a brewing process, according to the type of capsule used and the coffee beverages to be produced.

The present invention provides a solution to the beforementioned problems as well as offers additional benefits to the existing art.

OBJECT AND SUMMARY OF THE INVENTION

A first aspect of the invention relates to a method for preparing a beverage by centrifugation of a capsule in a centrifuging brewing device of a beverage preparation system. The beverage preparation system comprises control means adapted to control parameters of the centrifuging brewing device used during the beverage preparation process. The method comprises the following step:
  (a) in a first step, recognition information related to a type of the capsule inserted by a user in the centrifuging brewing device, and/or ingredients enclosed within said capsule, is determined;
  (b) in a second step, a recipe is selected according to the recognition information; said recipe comprising at least two sets of target values for parameters of the centrifuging brewing device, each set being associated to a specific condition;
  (c) in a third step, the control means control the parameters of the centrifuging brewing device so as to reach the target values of the set associated to the specific condition that is currently met.

The term recipe refers to information for controlling the beverage preparation device in order to prepare a beverage.

More particularly, a recipe may comprise information related to the beverage preparation parameters, notably parameters that are controlled by the control unit such as the rotational speed of the motor driving the rotating brewing unit, the temperature of the liquid, the temperature of the collector where the liquid ejected from the capsule is collected, the pressure and/or the volume of the liquid provided to the capsule during the beverage production process, the flow rate of the pump, etc. The method allows preparing a coffee beverage with capsules of different types, using a specific recipe for each type of capsules and/or for each ingredient contained in said capsules.

In particular, the parameters may dynamically be changed over time and precisely defined. The invention allows defining precise profiles of extraction for different types of capsules, including variations of parameters over time or according to other characteristics of the preparation process, in a reliable and user-transparent way. During the second step, the recipe may be determined and/or retrieved according to information related to the beverage to prepare gathered and/or determined during the first step. The recipe may be determined and/or retrieved according to the type of the capsule inserted into the capsule holder of the machine, the ingredients contained in the capsule inserted into the capsule holder, and/or information provided by the user and/or embedded into said capsule. The recipe may be read from a list stored in the machine and/or accessible by the machine, using for example an identifier of a recipe and/or an identifier of the type of the capsule and/or an identifier of the ingredients contained in the capsule, and/or information provided by a user. During the third step, the different parts of the beverage preparation machine are regulated so as to apply the target value of the corresponding parameters included in the recipe. For example, the flow rate and quantity of liquid are controlled by a flow meter that provides flow information to the control unit for calculation and control of the liquid supply pump in order to reach the target level described in the recipe when the related specific condition is met, for example for a given time or volume of prepared beverage.

In particular, the specific condition for at least one of the two sets is related to the volume of coffee already prepared. For example, a condition may be for instance: "volume of coffee already prepared is comprised between 0% to 50% of the total volume of coffee to prepare".

Preferably, the at least two sets of target values relate to at least two sequential brewing phases. Therefore, it becomes possible to manage a wide range of coffee recipes for various coffee volumes. In particular, it becomes possible to optimize the extraction characteristics depending on type of coffee to be produced (e.g. ristretto, espresso, long coffee, coffee for milk and coffee specialties). This is also made possible to achieve a variety of coffee quality/sensory attributes (body, taste, aroma, crema, . . . ) for each volume considered.

The specific condition for at least one of the two sets may also be related to the time elapsed since the beginning of the preparation of the beverage. For example, a condition may be for instance: "time elapsed since the beginning of the preparation process is comprised between 5 s and 10 s".

The specific condition for at least one of the two sets may also be related to a user input or a preference for the preparation of the beverage. For example, a condition may be for instance: "user have chosen a volume of beverage to prepare greater than 120 ml". It is then possible to optimize the recipe according to different choices of the user.

More particularly, at least one of the target values for parameters of the centrifuging brewing device comprised in the sets is related to at least one or a combination of the following parameters: a volume of liquid to introduce in the capsule during a specific phase of the preparation process, a flow rate of liquid, a waiting time after a specific phase of the preparation process, an acceleration/deceleration function of the rotational speed of the brewing unit during a specific phase of the brewing or during transition between specific phases, an initial flow rate of liquid introduced into the capsule during a specific phase of the brewing or during transition between specific phases, an acceleration/deceleration of the flow rate of liquid introduced into the capsule during a specific phase of the brewing or during transition between specific phases, a temperature of liquid during a specific phase of the brewing process, a target temperature of a collector of the brewing device during a specific phase of the brewing process or the pre-wetting process, a minimal rotational speed of the brewing unit during a specific phase of the brewing process.

In an embodiment, during the first step, identifying means provided on the capsule inserted in the centrifuging brewing device are read, said identifying means comprising information suitable for the control unit to retrieve or determined the type of the capsule and/or the ingredients enclosed within the capsule and/or the type of beverage to prepare with the capsule. For example, such a suitable capsule and the related systems for identifying said capsule are disclosed in WO 2011/141532. The code may comprise an identifier of a recipe, for example a unique number corresponding to a recipe. The code may comprise an identifier related to the type of capsule and/or to the type of ingredients included in the capsule, for example a unique number corresponding to the type of capsule and/or to the type of ingredients included in the capsule.

The identifying means may comprise information related to a location where the recipe may be accessed, the control unit being arranged to retrieve the recipe using the information related to a location during the second step.

A code on the capsule may contain said address. The address may point at a memory space in the machine in which the recipe is stored. Alternatively, the address may point to an external memory location where the recipe is stored, the machine being arranged to retrieve the information related to said recipe at said location. As a consequence, it allows the machine to access to a recipe not already available locally. Alternatively, the address may point to an external device, the external device being arranged to send a recipe upon reception of a request. As a consequence, it allows the machine to access to a recipe not already available locally.

In an embodiment, the identifying means may comprise at least part of the information related to a recipe to be used with the capsule, the control unit being arranged to use said information if the recipe cannot be retrieved and/or in place of corresponding parameters of the recipe. It allows the machine retrieving information related to the recipe even if the recipe is not fully available locally, or if the recipe has been updated or modified comparatively to the locally stored recipes, and optionally, updating the corresponding entry in its recipe's list and/or the recipe itself.

In the following aspects, the versatility to produce, according to the method of the invention, a wide range of different coffee recipes depending on the coffee volume and coffee product characteristic is further exemplified. According to these preferred modes, it becomes possible to design a wide range of (preferably black) coffee beverages (e.g., ristretto, espresso, lungo, long coffee) while optimizing and individualizing their product quality characteristics (i.e., intensity, aroma, 'crema').

In particular, the method comprises at least first and second brewing phases defined respectively by first and second sets of target values. The said first and second sets of target values preferably comprises each at least a target temperature of the heater, a target flow rate of the pump and a target rotational speed; optionally, a target temperature of the collector.

Preferably, the first set of target values of the first brewing phase is associated to a condition that states that the first brewing phase is run under the first set, after the end of a pre-wetting phase or prewetting waiting phase, until the volume of the coffee beverage already prepared is greater than or equal to a first phase volume threshold of liquid introduced into the capsule. More preferably, the second set of target values of the second brewing phase is associated to a condition that states that the second brewing phase is run under the second set, after the end of the first brewing phase, until the volume of the beverage is already prepared is greater than or equal to a second phase volume threshold (also referred as the "transition volume" or "phase volume threshold" in the description) of liquid introduced into the capsule.

By having such independently controlled brewing phases, it becomes possible to deliver coffee beverages of different volumes in a large diversity of product characteristics (aroma, taste, crema, . . . ). Such control can be associated with a high number of different roast & ground coffee characteristics such as coffee blends, coffee origins, coffee granulometry (e.g., average particle size, distribution, fine content), coffee processing such as roasting degree, coffee weight, and so on, so that a huge number of different coffee extracts can be designed and produced in a reproducible manner from an infinite possible number of encoded recipes.

Most preferably, the recipe comprises at least a third brewing phase defined by a third set of target values and associated to a condition to be run after the end of the second brewing phase and until the volume of the beverage already prepared is at least equal to the volume of beverage to prepare. The third brewing phase comprises a third set of target values comprising at least a target temperature of the heater, a target flow rate of the pump and a target rotational speed; optionally, a target temperature of the collector.

Having a three brewing phases associated to adjustable conditions for running/ending these brewing phases at determined moments enables to better manage the coffee recipes over a wider range of volumes, from the very short coffee extract (25 ml) to the large coffee volumes (e.g., 230 ml, 250 ml, 400 ml) and enables to properly master the diversity of liquid coffee extracts delivered within each volume. It becomes thereby possible to run different profiles of parameters (with two possible directional changes) to fine tune the coffee extraction such as for temperatures, rotational speed, flow rates.

For example, the recipe management over two or three brewing phases enables to take into account the coffee extraction specificities according to the type of coffee targeted. For instance, this enables to decrease the over-extraction of long coffees by profiling the temperatures and/or the flow rates. For example, the flow rate can be increased and/or the heater temperature decreased from one brewing phase to the next. It may also enable to maintain the quality of 'coffee crema' high, in particular for large coffee volumes (i.e., avoiding 'crema' to collapse or bubbles to agglomerate) by profiling (e.g., decreasing) the temperature of the heater and/or of the collector over the different brewing phases. For example, the temperature of the collector can be decreased from one brewing phase to the next.

In an aspect, the recipe further comprises a final drying phase. In particular, the recipe comprises a set defining a drying phase associated to a condition that states that the drying phase starts under the said set, after the last brewing phase (e.g., the third brewing phase), until the drying is completed or a time is elapsed. The set may preferably comprise a target rotational speed for the motor and OFF command for the switching off of the heater and/or an OFF command for the switching of the pump.

The recipe may further comprise an initial compacting step for compacting the ingredients, e.g., roast and ground coffee powder, in the capsule by effect of centrifugal forces before liquid is introduced into the capsule. In such case, the compacting phase is run automatically, after activation of the recipe mode, by the setting of a high rotational speed of the motor and by stopping the rotational speed after a predetermined time has elapsed (e.g., 2-3 s). This step is preferably the first step at which the recognition information related to a type of the capsule inserted by a user in the centrifuging brewing device, and/or ingredients enclosed within said capsule, is determined. A set target can so be the rotational speed to enable the reading of a code, (e.g., a rotationally readable barcode) on the capsule by a fixed code reader of the device.

The method also preferably comprises an exit condition for an initial compacting step which is that the capsule type is identified by identifying means (such as a rotational code readable by a fixed reader) provided on the capsule. If the capsule is recognized, the next prewetting step is started.

According to a second aspect the invention relates to a centrifuging brewing device for preparing beverages by centrifugation of a capsule, comprising
a rotary capsule holder of the brewing device for holding a capsule,
rotary drive means to drive the capsule in rotational centrifugation,
injection means for injecting liquid in the capsule, wherein the injection means are connected to a pump,
the device further comprising control means connected to at least the rotary drive means and the pump which are designed to vary the flow rate of the beverage and/or the volume of the beverage and,
recognition information means to determine the recognition information related to a type of the capsule inserted in the device,
wherein the control means are arranged to execute steps of the method according to the first aspect.

The brewing device of the invention preferably further comprises heating means for heating the liquid introduced in the capsule (i.e., liquid heating means) and heating means for heating the collector of the beverage dispensed from the capsule (i.e., collector heating means) and temperature control means for controlling the temperature of the liquid heating means and collector heating means.

According to a third aspect, the invention relates to a kit (or series) of capsules of different types, wherein each capsule of the kit being adapted to be used, by a centrifuging brewing device according to the second aspect, to prepare a coffee beverage using a specific recipe according to the type of said capsule and/or according to the ingredient contained in said capsule. In particular, each capsule of the kit may be provided with recognition means. Recognition means associated to the different capsules of the kit may be one or a combination of the following list: barcode, an RFID tag, image and/or colour recognition means, ferro-magnetic element, electrical element, mechanical means. Said recognition means is arranged to be readable by a reader embedded in the centrifuging brewing device, said reader being suitable for reading the recognition means of the capsule. The reader may be connected to the control unit of the device for controlling the different means of the device in response to the detected capsule.

In particular, the capsules of kit according to the third aspect comprise coffee powder of different sorts to produce coffee beverages having specific quality characteristics (strength, aroma, taste, crema, . . . ) and different volumes, e.g., 25, 40, 110, 250, 400 mL (e.g., ristretto, espresso, lungo, doppio, Americano, Long black coffee, etc) with preferably variable crema characteristics (volume and/or texture).

More preferably, each capsule of the kit comprises recipe related information, such as a recipe number, such information being identifiable by the recognition information means of the device for enabling the selection of the corresponding recipe according the recognition information related to the type of capsule and for enabling the processing of the recipe by the control means according the method of the invention.

By "different sorts" of a beverage substance or coffee it is meant any difference regarding: weight in the capsule, grind size, tap density, roasting levels, origins, blends, nature of ingredients (coffee, tea, cocoa, additives, etc.) and combinations thereof.

The term "brewing phase" generally refers to the period coffee beverage is produced and dispensed from the capsule while liquid (water) is supplied by the pump to the capsule and the capsule is rotated at the rotational speeds enabling such coffee extraction to take place and coffee extract to dispensed. The term "pre-wetting phase" generally refers to the period liquid is fed by the pump to the capsule but coffee is not yet dispensed. The term "prewetting waiting phase" refers to the period following the prewetting phase and preceding the first brewing phase, during which liquid is present in the capsule for wetting the beverage ingredients and the capsule is not yet rotated at the rotational speed enabling the coffee extraction to take place. The term "drying phase" generally refers to the time liquid is no longer supplied to the capsule by the pump and the capsule is rotated at elevated rotational speed to remove liquid from the capsule. When referring to "the volume of coffee already prepared" or "phase volume threshold" or "transition volume", it is meant a volume of liquid introduced by the pump into the capsule expressed in percentage (e.g. 20, 40, 90%) of the total target coffee volume (e.g. 25, 40, 230 ml) and eventually taking into account a residual volume of liquid after drying.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF THE FIGURES

Figure 1A:
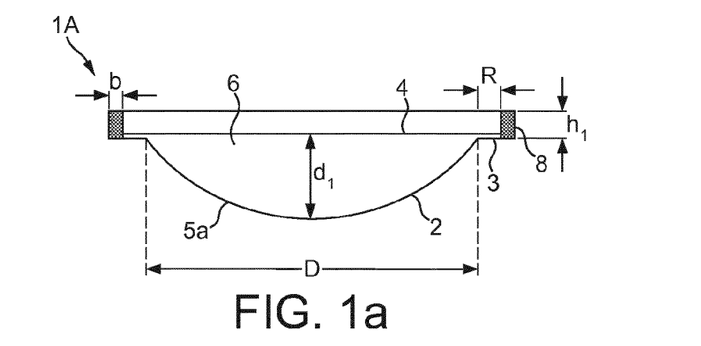
FIG. 1a-1c are cross sectional side views of different embodiments of a capsule having different sizes according to the invention and a variation of height of their rim.
Figure 1B:
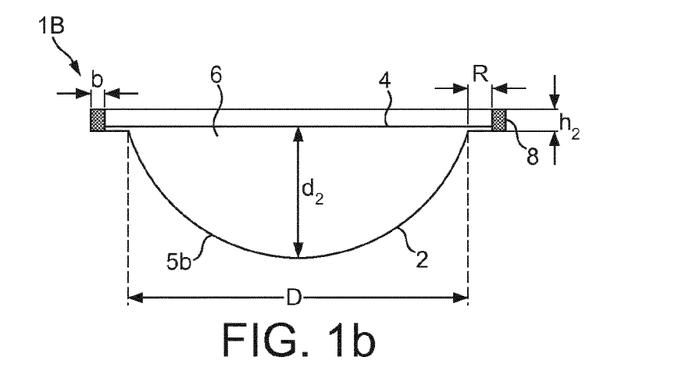
Figure 1C:
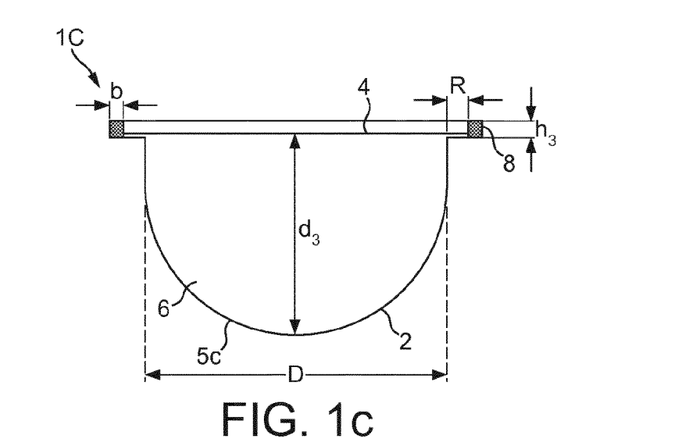

FIGS. 1a, 1b and 1c relate to an embodiment of a set of receptacles, more particularly single-use capsules 1A, 1B, 1C. The capsules preferably comprise a cup-shaped body 2, a rim 3 and an upper wall member respectively a perforable membrane 4. Thereby the membrane 4 and the body 2 enclose a compartment 6 containing coffee powder. As shown in the figures, the membrane 4 is preferably connected onto an inner annular portion R of the rim 3 that is preferably between 1 to 5 mm. The membrane 4 is connected to the rim 3 of the body by a sealed portion (e.g., a welding joint).

The rim 3 of the capsules preferably extends outwardly in a direction essentially perpendicular (as illustrated) or slightly inclined relative to the axis of rotation Z of the capsule 1. Thereby, the axis of rotation Z represents the axis of rotation during centrifugation of the capsule in the brewing device.

In other non-illustrated embodiment, the capsule 1 in particular the capsule body 2 may take various different shapes.

The body 2 of the respective capsule has a single three-dimensional convex portion 5a, 5b, 5c of variable depth, respectively, d1, d2, d3. Hence, the capsules 1A, 1B, 1C preferably comprise different volumes but a same insertion diameter 'D' for facilitating insertion in the beverage producing device. The capsule of FIG. 1a shows a small volume capsule 1A whereas the capsule of FIG. 1b show a larger volume capsule 1B or medium volume capsule and the capsule of FIG. 1c show an even larger volume capsule 1C or large volume capsule. In the present embodiment, the insertion diameter 'D' is hereby determined at the line of intersection between the lower surface of the rim 3 and the upper portion of the body 2.

The body 2 of the capsules is preferably rigid or semi-rigid. It can be formed of a food grade plastic, e.g., polypropylene, with a gas barrier layer such as EVOH and the like or aluminium alloy, a laminate of plastic and aluminium alloy or a biodegradable material such as vegetable fibres, starch or cellulose and combinations thereof. The membrane 4 can be made of a thinner material such as a plastic film also including a barrier layer (EVOH, SiOx, etc.) or aluminium alloy or a combination of plastic and aluminium alloy. The membrane 4 is usually of a thickness between 10 and 250 microns, for example. The membrane is perforated for creating the water inlet as will be described later in the description. The membrane also further comprises a perforable peripheral outlet area or portion.

Instead of the upper membrane 4, the capsules 1A, 1B, 1C may as well comprise a filter wall or rigid or semi-rigid lid member which preferably has the form of a disk of plastic comprising a central portion having an inlet port for enabling the introduction of a water injection member and a peripheral outlet portion having circumferentially arranged outlet openings. Between the central inlet port and the peripheral outlet openings, the membrane or lid is preferably formed of a liquid impermeable intermediate portion thereby ensuring that liquid cannot escape the capsule before reaching the periphery of the capsule.

The volume difference between the small and large capsules can be obtained particularly by varying the depth (d1, d2, d3) of the body 2 of the capsules in the set. In particular, the depth of the body of the smaller capsule 1A is lower than the depth of the body of the larger capsules 1B, 1C. The differences between storage volumes (or size) of each capsules allow filling different quantities of coffee powder in the capsules as a function of the coffee beverage to be delivered. In general, the larger the capsule, the higher the quantity of coffee powder it contains. Also in general, the higher the quantity, the larger the coffee extract delivered. For this, the higher the quantity of coffee powder, the larger the volume of liquid fed in the capsule. Of course, the coffee quantity could as well be varied in a capsule of same volume, but in which case, the larger capsule would preferably be chosen for all size of beverages to be delivered.

The small volume capsule 1A preferably contains an amount of coffee powder, smaller than the amount for the larger volume capsules 1B, 1C. The medium volume capsule 1B also contains an amount of coffee powder smaller than the amount of the large volume capsule 1C. In other words, the amount of powder preferably increases with the volume of the capsule.

Hence, the small capsule 1A becomes preferably intended for delivery of a short coffee of between 10 ml and 60 ml, preferably 25 (+/−3) ml for ristretto and 40 (+/−3) ml for espresso, with an amount of ground coffee comprised between 4 and 15 grams, more preferably between 5 and 8.5 grams, most preferably 7 and 8 grams. The medium-size capsules 1B is preferably intended for delivery of a medium-size coffee, e.g., between 60 and 120 ml, more preferably 120 (+/−10) ml for a lungo coffee. The largest capsule 1C is preferably intended for delivery of a long-size coffee, e.g., between 120 and 500 ml (preferably 230 (+/−10) ml for a large coffee). Furthermore, the medium-size coffee capsule 1B can contain an amount of ground coffee comprised between 7 and 15 grams, more preferably between 8 and 12 grams and the long-size coffee capsule 1C can contain an amount of ground coffee between 10 and 30 grams, more preferably 12 and 15 grams.

In addition, the capsules in the set may contain different blends of roast and ground coffee and/or coffees of different origins and/or having different roasting and/or grinding characteristics (i.e., measurable as the average particle size D4, 3). Coffee powder is preferably loose in the receptacle. As usual in portioned coffee area, coffee powder can be just slightly pressed before closing with the capsule with the lid.

The grind size is selected in each capsule to ensure improved extraction. In particular, the small capsule 1A is preferably filled with ground coffee having an average particle size D4, 3 within a range of 50 to 500 microns, more preferably 160 to 400 microns. It is surprising to notice that the particle size for short cups can be successfully lowered compared to traditional extraction method where 220 microns is usually the lower limit to avoid clogging of the coffee extract in the capsule. Therefore, the capsule 1A is filled with ground coffee having an average particle size D4, 3 comprised between 160 and 255 microns, most preferably 160 and 220 microns.

For a medium-size such as lungo (120 ml), it was surprisingly found that better results on sensory tasting were obtained when selecting an average grind size of coffee powder above 200 microns, in particular, between 300 and 700 microns. Of course, these results are also blend and roasting dependent but in average better results were found in these preferred selected ranges.

As indicated in FIGS. 1a to 1c, the geometry of the rim 3 may be adapted to comprise, for example, an L-shaped cross section having an annular outer protrusion 8 formed in a direction perpendicular to a plane in which the membrane 4 is arranged. Thereby, the thickness h1, h2, h3 of the rim 3 is preferably adapted to the amount and/or characteristics of the beverage substance contained by the shown capsules 1A, 1B and 1C in order to enable an adjustment of the back-pressure exerted onto the capsule when being enclosed by a dedicated enclosing member 15 of a beverage production device.

In particular, for capsules containing a small amount of coffee powder—e.g. capsule 1A—in order to prepare e.g. a ristretto or espresso coffee beverage, a slower extraction might be desired for providing the coffee with a high intensity (i.e., a large amount of total coffee solids transferred in the coffee extract). These characteristics can be compared to a faster extraction which might be desired for the beverage coming out of capsules 1B or 1C containing a larger amount of coffee powder. The extraction is here defined as "slower" by controlling a slower flow rate of the liquid extract during extraction. Such slower flow rate can be controlled by rotating the capsule at a lower speed and/or providing a higher back-pressure through the restriction of the liquid extract leaving the capsule. In other words, the smaller the amount of coffee powder in the capsule, preferably the slower the flow rate.

For example, for smaller-size capsules as indicated by FIG. 1a, the thickness h1 is preferably chosen to be between 0.5 and 2.5 mm. For bigger-size capsules as indicated by FIGS. 1b and 1c, thickness h2 respectively h3 is preferably chosen to be between respectively 0.8 and 1.8 mm and between 0.5 and 1.5. Of course such values can differ greatly depending on the configuration of the valve means, in particular, on the device side.

It is to be understood that the thickness (h1, h2, h3) of the rim 3 respectively the annular protrusion 8 of a specific capsule may not only be adapted with regard to the capsule volume (i.e., storage volume), but also with regard to the nature of the beverage substance (e.g., amount, density, composition, etc.) contained within the capsule such that the back-pressure resulting when the rim 3 of the capsule is engaged with a portion of valve of the dedicated device, is adjusted to a desired value. The thickness is the effective distance which is adapted to adjust the back-pressure during the beverage extraction process by insertion of the capsule in the device.

In a possible alternative, the thickness (h1, h2, h3) is the same throughout the types of capsules. As a result, the same initial closing pressureresulting from the engagement of the portion of valve of the device on the rim is achieved. The back-pressure may then be controlled depending on the type of capsule and/or coffee to be delivered by adjusting various operational and/or product parameters such as the liquid flow rate, the rotational speed, the sets of parameters for the pre-brewing phases (compaction, pre-wetting, acceleration ramp of the rotational speed, . . . ) and/or the characteristic of the roast and ground coffee powder in the capsule (weight, granulometry, . . . ).

Figure 2:
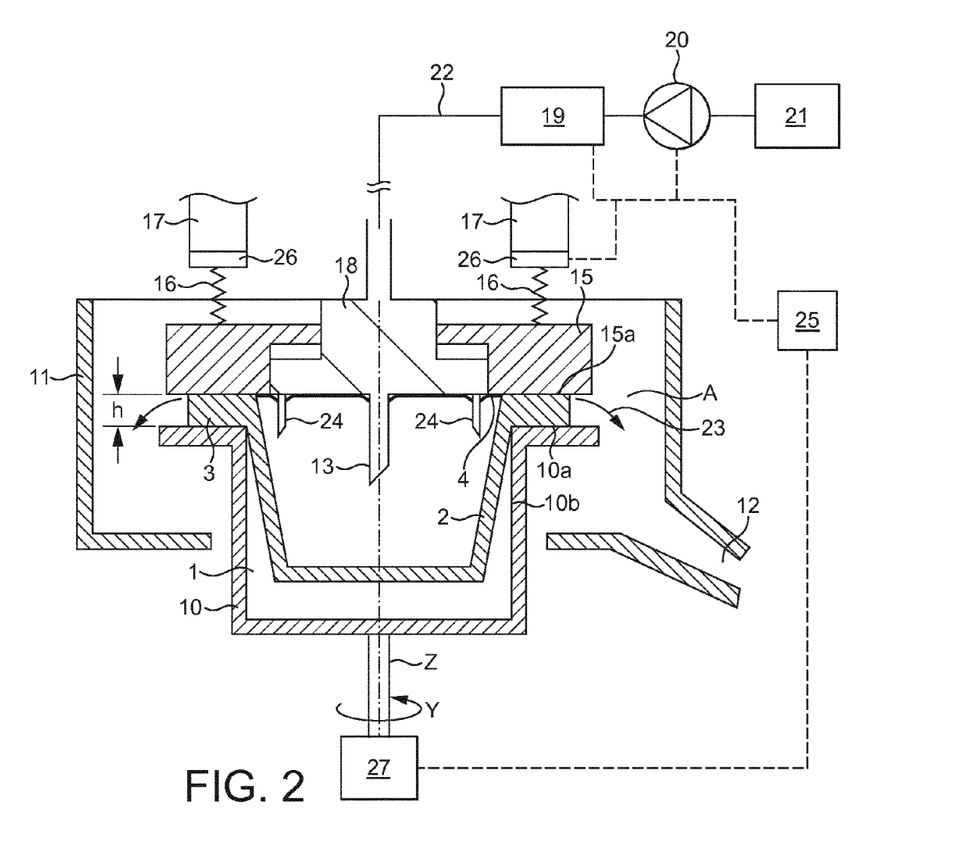
FIG. 2 is a schematic representation of the centrifugal device into which is inserted a capsule according to the invention, wherein the back-pressure is exerted by spring loading means.

FIG. 2 shows a sectional side view of a beverage producing device according to the system of the invention in a closed state thereof. Thereby, the device comprises a rotating driving means including a rotating capsule holder 10, a rotary motor 27, connected to the capsule holder 10 by an axle of rotational axis Z. The device also comprises a collector 11 onto which the centrifuged liquid impacts and is drained through a beverage outlet 12.

Furthermore, the device comprises liquid feeding means 18 having a liquid injector 13 being arranged to pierce the membrane 4 of the capsule 1 in a central portion thereof and feed liquid (preferably hot water) in the capsule. The injection means 18 preferably also comprise a series of outlet perforators 24 as described in WO2008/148604. Accordingly, outlets are produced in an annular portion of the membrane 4 to enable to an extracted beverage to leave the capsule 1 during the rotational movement thereof. The liquid feeding means 18 are connected to liquid circuit 22 comprising a liquid supply 21, a pump 20 and heater 19 for providing a predefined volume of heated pressurized liquid to the capsule 1 during the beverage preparation process.

The device further comprises a valve portion 15 which is arranged circumferentially to the liquid feeding means 18 and which has a lower annular pressing surface 15a.

The valve portion 15 and the injection unit 18 are preferably movable with respect to the capsule holder 10 in order to enable insertion and ejection of the capsule 1 to and from the capsule holder 10 before respectively after the beverage preparation process. Moreover, the liquid feeding means 18, the valve portion 15 and the capsule holder 10 are rotatable about axis Z. The valve portion 15 is also made moveable independently from the liquid feeding means 18 to take into account the different possible thicknesses of the capsules without affecting the relative position of the injection portion when engaged against the capsule. For this, portion 15 can be slidably mounted about liquid feeding means 18.

The capsule 1 also lies solidly on its rim 3 onto an upper flange 10a of the capsule holder 10 without the body 2 substantially deforming radially. In this configuration, the liquid feeding means 18 and the valve portion 15 are engaged against the membrane 4 and rim, respectively. The system thereby forms a restriction valve 23 by engagement of the valve portion 15 of the device and valve portion 8 of the capsule. In open configuration of the valve 23, a flow restriction is created that enables to force the flow of centrifuged liquid into at least one narrow jet of liquid projected onto the impact surface 11 of the device. The restriction forms an annular opening of surface area preferably comprised between 1.0 and 50 mm2, preferably between 1.0 and 10.0 mm2. The surface area of the flow restriction can vary depending on the set backpressure value in the valve by the capsule, the shape of the valve portion, and the rotational speed of the capsule wherein in general the higher the speed, the larger the surface area. The flow restriction can be formed as a continuous circumferential slit or a plurality of discrete circumferential restriction openings.

The restriction valve 23 is designed to close or at least restrict the flow passage under the force of a resilient closure load obtained by a load generating system 16, 17 comprising preferably spring-biasing elements 16. The spring-biasing elements 16 apply a predefined resilient load onto the enclosing member 15. The load primarily distributes itself along the pressing surface 15a of the valve portion 15 acting in closure against the annular surface of the valve portion of rim 3. Such surface may also be a simple annular contact line. Therefore, the valve 23 normally closes off the flow path for the centrifuged liquid until a sufficient pressure is exerted on the upstream area of the valve by the centrifuged liquid exiting through the orifices created by the perforating elements 24. It should be noted that a small leakage for liquid or gas through the valve means 23 may be required that helps vent the gas or air contained in the capsule during the prewetting of the capsule with liquid (not shown). Preferably, the gas leakage is controlled to be sufficiently small to be tight to liquid or at least reduce liquid flow to a small leak, at least until a certain pressure is reached at the periphery of the capsule.

During extraction, the liquid flows thus between the membrane 4 and the valve portion 15 and forces the valve 23 to open by pushing the whole enclosing member 15 upwards against the force of the spring-biasing element 16. The centrifuged liquid can thus traverse the restriction created between the surface 15a of the portion and the upper surface or line of the rim 3 or protruding portion 18. The liquid is thus ejected at a high velocity against the collector 11 as indicated by arrow A in FIG. 2 or another vertically oriented annular wall of the device placed between the collector and the valve 23 (not shown).

It has been found that the "crema" can be significantly improved in the cup by controlling the distance, herein called "flying distance", between the outermost centrifuged surface of contact (e.g., flow restriction or another surface) and the impact wall (e.g., the cylindrical vertical wall in FIG. 2) of the collector 11. In particular, the distance is found to be shorter for providing a larger amount of crema. It was found that a preferred flying distance is within a range of 0.3 to 10 mm, more preferably 0.3 to 3 mm, most preferable between 0.5 and 1 mm. Therefore, it was also found that the flying distance should increase when the volume of the coffee extract to be delivered increases in order to adjust the amount of crema accordingly. Surprisingly, the largest crema was always obtained for distances below 1 mm of flight. Of course, the formation of crema also depends on other possible parameters such as the back-pressure of the valve which can be adjusted accordingly as explained later on (Typically, the higher the back-pressure the larger the crema).

Thereby, extraction of the beverage out of the capsule 1 is obtained by driving the liquid feeding means 18, the valve portion 15 and the capsule holder 10 together with the capsule, in rotation (Y) about axis Z while feeding liquid in the capsule. The rotation is driven by rotational motor 27 connected to at least the capsule holder 10 or the injection unit 18. Hence, during operation of the capsule 1 placed into the system according to the invention, the capsule 1 is rotated about its axis Z. Thereby, liquid which is centrally injected into the capsule 1 would tend to traverse the coffee powder and be guided along the inner surface of the side wall of the body 2, up to the inner side of the membrane 4, and then through the perforated outlet openings created in the membrane 4 by the perforating members 24. Due to the centrifugation force given to the liquid in the capsule 1, the liquid and coffee powder are made to interact in order to form a liquid comestible (e.g., liquid extract) before leaving through the valve 23.

It is to be understood that the force acting on the rim 3 of the capsule 1 by the pressing surface 15a can be adjusted by the geometry of the rim 3 such as e.g. the thickness h of the rim 3 (or thickness h1, h2 and h3 of the outer protrusion 8 in FIGS. 1a-1c). Hence, in particular the exerted back-pressure acting on the rim 3 can be adjusted by adapting the thickness h of the rim 3 to predefined values thereof. Thereby, a higher back-pressure can be obtained by a larger thickness "h", since this leads to a higher compression of the spring biasing element 16 which then exerts a higher force onto the pressing surface 15a. Correspondingly, a lower value of thickness "h" leads to a lower compression of the spring biasing element 16 and thus, to a relative lower force acting on the pressing surface 15a, so a lower back-pressure. Hence, the thickness h is preferably designed to increase for obtaining a resulting higher back-pressure. As illustrated in FIG. 2, a sensing means 26 can be connected to a control unit 25 of the device in order to provide information related to the present back-pressure acting onto the rim 3 of the engaged capsule, i.e., pressure or force value.

The control unit 25 is preferably connected to at least the rotary motor 27, the liquid pump 20, the heater 19 and sensors. Thus, the beverage preparation parameters such as the rotational speed of the motor 27, the temperature, the pressure and/or the volume of the liquid provided to the capsule during the beverage production process may be adjusted and using eventually information of the sensing means 26 or other sensors in the device. Selection of the speed is provided in the control unit 25 which controls in return the rotary motor 26 and if necessary the flow rate of the pump 20 to ensure sufficient supply of liquid in the capsule as a function of the selected speed. Regulation of the pump might also be useful to limit the inlet pressure (pressure of the water injected in the capsule); such pressure limit being given by the sealing engagement of the capsule with the machine, e.g., by a sealing gasket around the injector 13.

In an embodiment, the capsule 1 includes identifying means to control brewing parameters and/or interact with the beverage production device. For example, such a suitable capsule and the related systems for identifying said capsule are disclosed in WO 2011/141532. Thereby, the identifying means preferably enable to provide information about the type of capsule engaged in the beverage production device.

Figure 3:
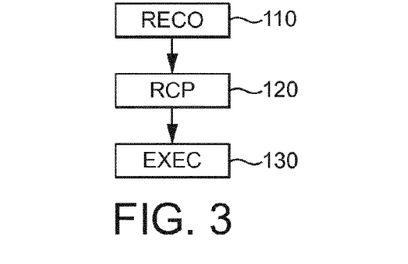
FIG. 3 is a block diagram representing the steps of an embodiment of the method according to the invention for preparing a beverage.

FIG. 3 illustrates steps of an embodiment of a method for operating the device according to an embodiment of the invention. More particularly, the method allows preparing a coffee beverage with any of the capsules of FIGS. 1a-1c using a specific recipe for each type of capsules and/or for each ingredient contained in said capsules. A recipe comprises information for controlling the beverage preparation device in order to prepare a beverage. More particularly, a recipe may comprise information related to the beverage preparation parameters, notably parameters that are controlled by the control unit 25 such as the rotational speed of the motor 27, the temperature of the liquid, the temperature of the collector 11, the pressure and/or the volume of the liquid provided to the capsule during the beverage production process, the flow rate of the pump 20, etc. More specifically, the recipe may comprise information related to at least one or a combination of the following information: a volume of liquid to introduce in the capsule during a specific phase of the brewing process or a pre-wetting phase, a flow rate of liquid during a pre-wetting phase, waiting time after a pre-wetting phase, a maximum volume of beverage to prepare, a recommended volume of beverage to prepare, a minimum volume of beverage to prepare, a volume of water remaining after a drying phase, an acceleration ramp of the rotational speed of the brewing unit during a specific phase of the brewing or during transition between specific phases, an initial flow rate of liquid introduced into the capsule during a specific phase of the brewing or during transition between specific phases, an acceleration ramp of the flow rate of liquid introduced into the capsule during a specific phase of the brewing or during transition between specific phases, a target temperature of liquid during a specific phase of the brewing process or the pre-wetting process, a target temperature of the collector during a specific phase of the brewing process or the pre-wetting process, a transition point identifying the start and/or end of different phases of the brewing process or pre-wetting process, a minimal rotational speed of the brewing unit during a drying phase, an acceleration ramp of the rotational speed of the brewing unit during transition to a drying phase, a duration of a drying phase, etc.

In a first step 110, information related to the beverage to prepare is gathered and/or determined. For example, a type of beverage to prepare may be determined by recognizing the type of the capsule inserted into the capsule holder 10, and/or information provided by the user such as the volume of beverage to prepare. In an embodiment, the capsule 1 includes identifying means to control brewing parameters and/or interact with the beverage production device. For example, such a suitable capsule and the related systems for identifying said capsule are disclosed in WO 2011/141532. Upon insertion of a capsule 1a, 1b or 1c in the device as previously described, said capsule is recognized by using its identifying means, and/or information related to the beverage to prepare is read or determined using said identifying means.

In an embodiment of the first step, information related to the beverage to prepare is determined by reading in rotation a code printed in the peripheral rim of the capsule, after the introduction of said capsule in the capsule holder, as described in WO 2011/141532. The code may comprise an identifier of a recipe, for example a unique number corresponding to a recipe. The code may comprise an identifier related to the type of capsule and/or to the type of ingredients included in the capsule, for example a unique number corresponding to the type of capsule and/or to the type of ingredients included in the capsule.

Information related to the beverage to prepare may be retrieved by reading data to a specific address or receiving data from a specific address. A code on the capsule may contain said address. The address may point at a memory space in the machine in which the recipe is stored. Alternatively, the address may point to an external memory location where the recipe is stored, the machine being arranged to retrieve the information related to said recipe at said location. Alternatively, the address may point to an external device, the external device being arranged to send a recipe upon reception of a request.

The code may comprise at least part of the information related to a recipe to be used with the capsule. The information related to a recipe directly embed into the capsule may be used by the machine if other information related to the recipe are not available or partially available. For instance, the code may comprise any combination of information related to a volume of liquid to introduce in the capsule during a specific phase of the brewing process or a pre-wetting phase, a flow rate of liquid during a pre-wetting phase, waiting time after a pre-wetting phase, a maximum volume of beverage to prepare, a recommended volume of beverage to prepare, a minimum volume of beverage to prepare, a volume of water remaining after a drying phase, an acceleration ramp of the rotational speed of the brewing unit during a specific phase of the brewing or during transition between specific phases, an initial flow rate of liquid introduced into the capsule during a specific phase of the brewing or during transition between specific phases, an acceleration ramp of the flow rate of liquid introduced into the capsule during a specific phase of the brewing or during transition between specific phases, a target temperature of liquid during a specific phase of the brewing process or the pre-wetting process, a target temperature of the collector during a specific phase of the brewing process or the pre-wetting process, a transition point identifying the start and/or end of different phases of the brewing process or pre-wetting process, a minimal rotational speed of the brewing unit during a drying phase, an acceleration ramp of the rotational speed of the brewing unit during transition to a drying phase, a duration of a drying phase, etc.

In a second step 120, a recipe is determined and/or retrieved according to information related to the beverage to prepare gathered and/or determined during the first step 110. The recipe may be determined and/or retrieved according to the type of the capsule inserted into the capsule holder 10, the ingredients contained in the capsule inserted into the capsule holder 10, and/or information provided by the user and/or embedded into said capsule. The recipe may be read from a list stored in the machine and/or accessible by the machine, using for example an identifier of a recipe and/or an identifier of the type of the capsule and/or an identifier of the ingredients contained in the capsule, and/or information provided by a user.

In a third step 130, the beverage preparation machine prepares a beverage applying the recipe selected during the second step 120. More particularly, the control unit is arranged to regulate the different parts of the beverage preparation machine so as to apply the target value of the corresponding parameters included in the recipe. For example, the flow rate and quantity of liquid are controlled by a flow meter (not shown) that provides flow information to the control unit for calculation and control of the liquid supply pump in order to reach the target level described in the recipe for a given time or volume of prepared beverage.

In an embodiment, the recipe selected during the second step comprises at least two sets S1, S2 of parameters. Each set of parameters comprises conditions that should be met for applying the parameters of the corresponding set. For instance the sets S1, S2 may comprise respectively the conditions C1, C2, said conditions being related to the volume of coffee already prepared. The condition C1 may be for instance: "volume of coffee already prepared is comprised between 0% to 50% of the total volume of coffee to prepare". The condition C2 may be: "volume of coffee already prepared is comprised between 51% to 100% of the total volume of coffee to prepare". The control unit 25 is arranged to control the preparation during the third step 130 by applying the parameters of each set of parameters until the corresponding condition is verified. For example, the controller unit 25 is arranged to control the preparation by applying the parameters included in the set S2 until the condition C2 is verified, i.e. until the volume of coffee already prepared is comprised between 51% to 100% of the total volume of coffee to prepare.

Figure 4:
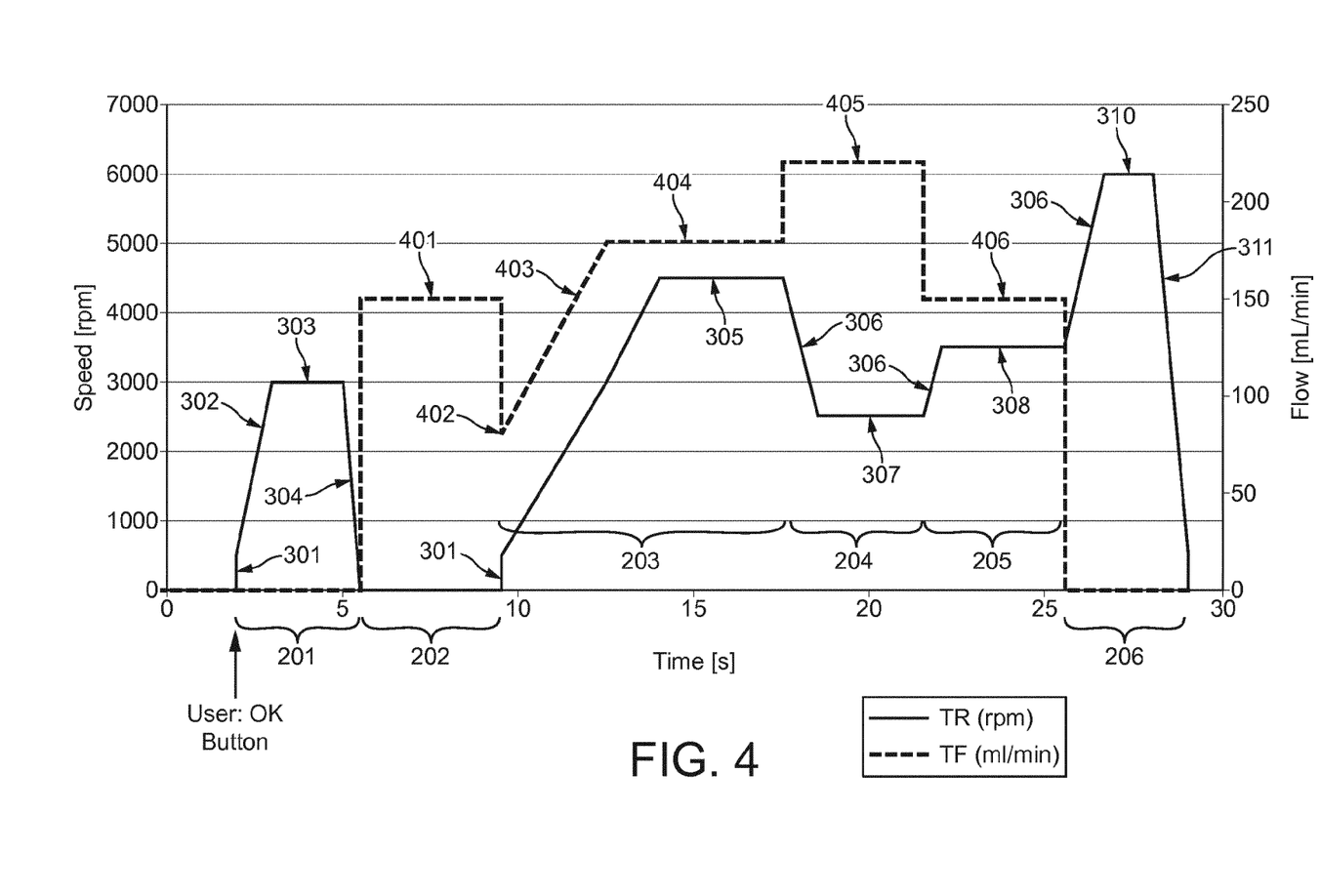
FIG. 4 is a diagram related to a recipe for preparing a beverage according to an embodiment of the invention.

Referring to FIG. 4, an example of beverage preparation process is now described. The X-axis of the diagram corresponds a time scale expressed in seconds. The left Y-axis of the diagram corresponds to the rotational speed of the motor 27 in revolutions per minute (rpm), the right Y-axis of the diagram corresponds to the flow of the pump 20. The curve TR corresponds to the target rotational speed of the motor 27 as described in the selected recipe. The curve TF corresponds to the target flow of the pump as described in the selected recipe.

After having inserted a capsule 1a, 1b or 1c in the device, said capsule being provided with a code, the user usually activates a switch (not shown) for starting the preparation process or the process can start automatically after insertion of the capsule in the device.

In a dry centrifugation or compacting phase 201, the control unit 25 commands the rotational driving means (motor 27 in FIG. 2) to start an optimal centrifugation of the dry coffee powder 301, 302, 303, 304. The liquid pump is not activated yet. The speed of rotation 303 is preferably relatively high, about 2000 to 5000 rpm, typically 3000 rpm, and its duration short, between 2 and 6 seconds, to ensure a compaction of the coffee against the periphery of the capsule, mainly against the sidewall and peripheral region of the upper wall. The code is read in rotation during this phase.

After having read the code during the first step 110, the controller uses said code to select or determine a recipe R. For instance, the control unit may retrieve data of the recipe R, during the second step 120, by using an identifier comprised in the code to access an internal memory where the corresponding recipe R is stored. In this example, the recipe R comprises 6 sets of parameters S1, S2, S3, S4, S5, S6, comprising respectively 6 conditions C1, C2, C3, C4, C5, C6.

The set S1 defines a pre-wetting phase 202. The condition C1 states that the set S1 should be used after the end of the dry centrifugation phase 201, until the capsule is filled with a pre-wetting volume PWV of liquid. The set S1 comprises a target temperature PWT of the heater 19, a target temperature PWTC of the collector 11, a target flow 401 of the pump 20, an OFF command for the motor 27 (or a target rotational speed of the motor 27 equal to 0 rpm).

The set S2 defines a pre-wetting waiting phase (not represented on the diagram of FIG. 4). The condition C2 states that the set S2 should be used after the end of the pre-wetting phase 202, until a pre-wetting waiting time PWTM is elapsed. The set S2 comprises an OFF command for the pump 20 (or a target flow rate for the pump equal to 0 ml/min).

The set S3 defines a first brewing phase 203. The condition C3 states that the set S3 should be used after the end of the pre-wetting waiting phase, until the volume of the beverage already prepared is greater than or equal to a first phase volume threshold VT1 of liquid. The set S3 comprises a target temperature TT1 of the heater 19, a target temperature TTC1 of the collector 11, a target flow command TFC1 of the pump 20, a target rotational speed command TRSC1 for the motor 27. The target flow command TFC1 of the pump 20 comprises an initial flow target 402, a flow acceleration target 403 and a flow rate target 404. The target rotational speed command TRSC1 comprises an initial rotational speed target 301, a rotational speed acceleration target and a rotational speed target 305. The initial rotational speed target 301 allow avoiding dead time at the beginning of the first brewing phase 203, reducing the reaction time of the motor.

The set S4 defines a second brewing phase 204. The condition C4 states that the set S4 should be used after the end of the first brewing phase 203, until the volume of the beverage already prepared is greater than or equal to a second phase volume threshold VT2 of liquid. The set S4 comprises a target temperature TT2 of the heater 19, a target temperature TTC2 of the collector 11, a target flow command TFC2 of the pump 20, a target rotational speed command TRSC2 for the motor 27. The target flow command TFC2 of the pump 20 comprises a flow rate target 405. The target rotational speed command TRSC2 comprises a transitional rotational speed target 306, and a rotational speed target 307.

The set S5 defines a third brewing phase 205. The condition C5 states that the set S5 should be used after the end of the second brewing phase 204, until the volume of the beverage already prepared is at least equal to the volume of beverage to prepare. The set S5 comprises a target temperature TT3 of the heater 19, a target temperature TTC3 of the collector 11, a target flow command TFC3 of the pump 20, a target rotational speed command TRSC3 for the motor 27. The target flow command TFC3 of the pump 20 comprises a flow rate target 406. The target rotational speed command TRSC2 comprises a transitional rotational speed target 306, and a rotational speed target 308.

The set S6 defines a drying phase 206. The condition C6 states that the set S6 should be used after the end of the third brewing phase 205, until the drying is completed or a time is elapsed. The set S6 comprises an OFF command for switching off the heater, an OFF command for switching off the pump, a target rotational speed command TRSC4 for the motor 27. The target rotational speed command TRSC2 comprises a rotational speed target 310 and a transitional rotational speed target 311.

In generally, the transition volume or "phase volume threshold" (in % of the total volume) is preferably determined by the device by determining the target cup volume (e.g., 220 ml) and the volume of liquid remaining in the capsule after drying (e.g. 12 ml), if such volume is set to 30%, the next brewing phase starts as soon as the integrated volume of liquid reaches 69.6 ml. The device also takes into account the variation of volume of liquid remaining in the capsule as a function of the volume of the capsule. In case the transition volume is set at 100% for a given brewing phase (e.g., third brewing phase), the brewing phase is simply ignored by the device.

Figure 6:
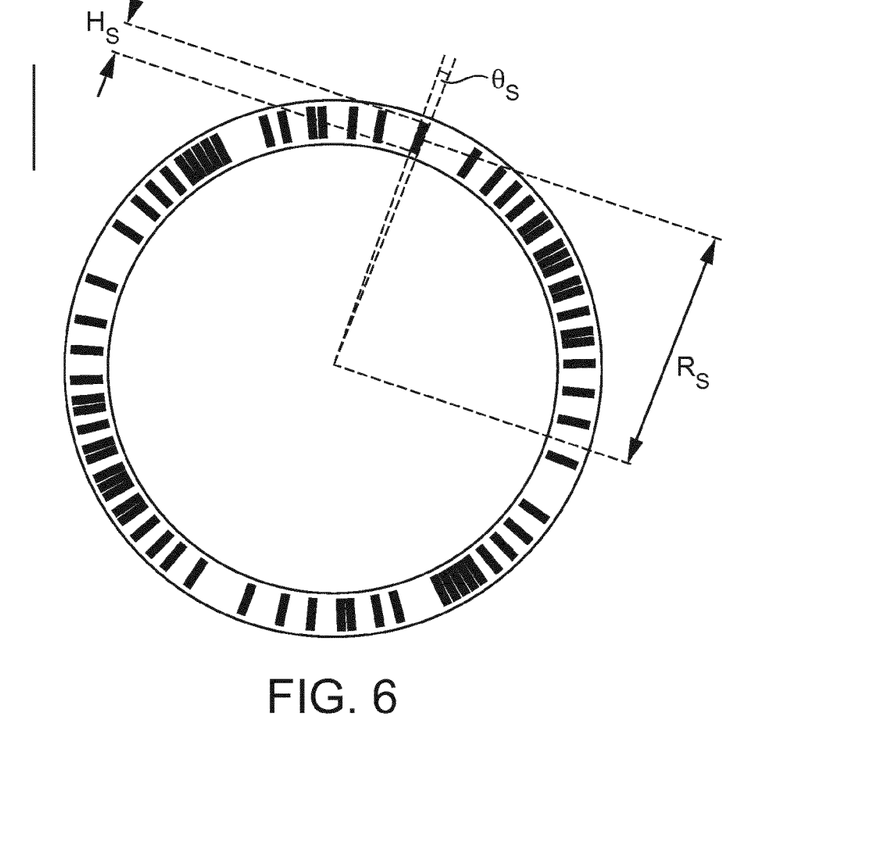
FIG. 6 shows an example of identifying means (rotational readable code) of the capsule.

Example of Identifying Means and Recognition Information:

Referring to FIG. 6, a code support is illustrated in planar view. The capsule according to the invention comprises at least one optically readable code support. The code support is adapted to be associated with or be part of a capsule, so as to be driven in rotation when the capsule is rotated around its axis Z by the centrifugal unit. The receiving section of the capsule is the lower surface of the rim 3 of the capsule. The code support may also be a ring having a circumferential part on which the at least one sequence of symbols is represented, so as the user can position it on the circumference of the capsule before introducing it into the brewing unit of the beverage machine.

Symbols are represented on the optically code support. The symbols are arranged in at least one sequence, said sequence code a set of information related to the capsule. Typically, each symbol corresponds to a specific binary value: a first symbol may represent a binary value of '0', whereas a second symbol may represent a binary value of '1'.

In the embodiment illustrated on FIG. 6, the support has an annulus shape with an inner radius of 24.7 mm and an outer radius of 27.5 mm. The mean radius R of the support 60b is equal to 26.1 mm. The symbols are positioned along a circle having a radius $R_S$ equal to 26.1 mm. The maximum value of the width Hs of each symbol is then equal to 2.8 mm. The code support 60b comprises 160 symbols, each symbol coding 1 bit of information. The symbols being contiguous, each symbol has an arc-linear length $\theta_S$ of 2.25°.

Figure 5A:
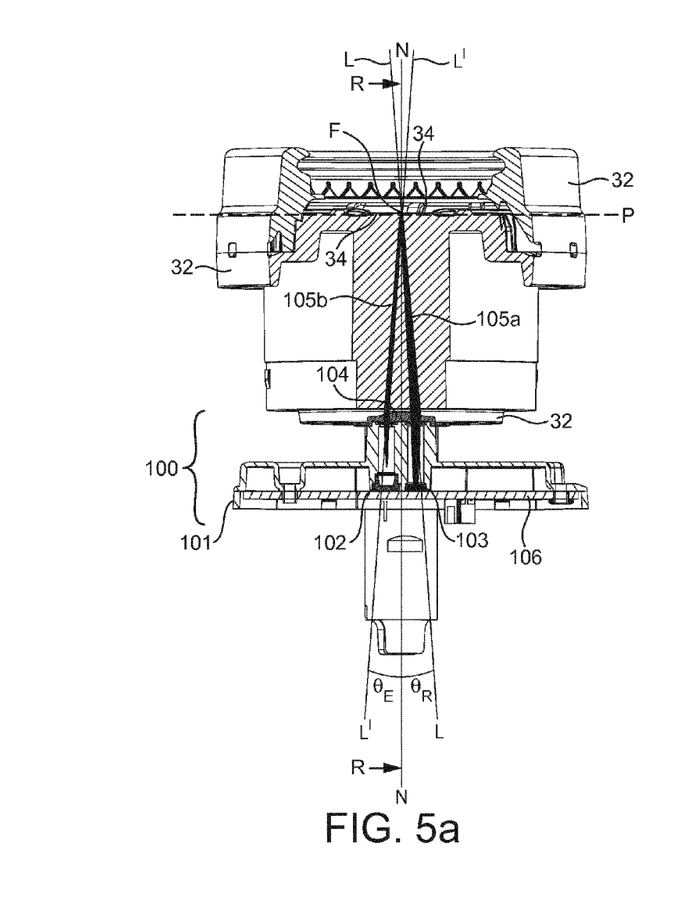
FIGS. 5a and 5b illustrate an example of the centrifugal capsule holder holding a capsule and the capsule recognition information means of the device associated therewith.
Figure 5B:
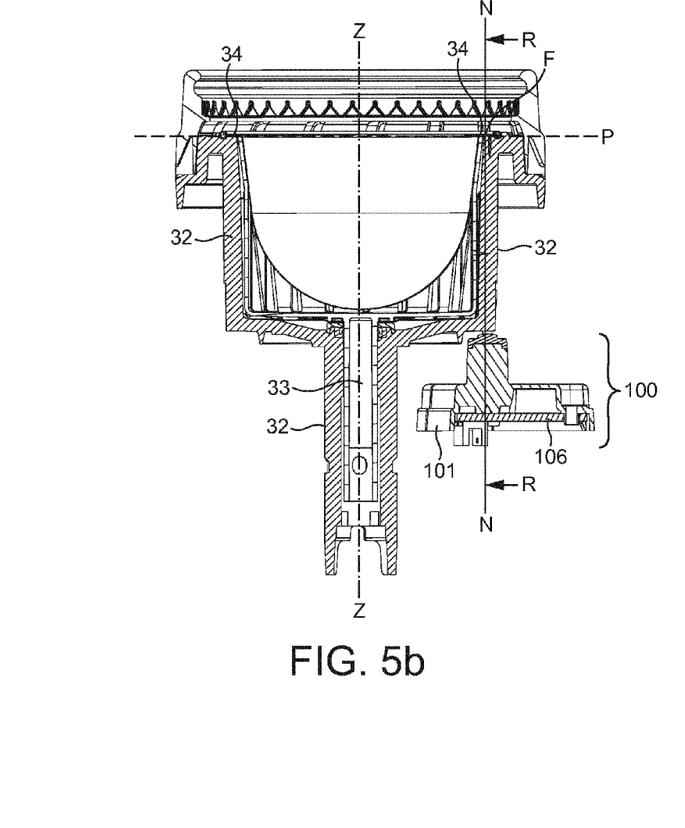

Each symbol is adapted to be measured by the reading arrangement 100 of FIGS. 5a and 5b when the capsule is positioned into the capsule holder and when said symbol is aligned with the source light beam 105a at point F. More particularly, each different symbol presents a level of reflectivity of the source light beam 105a varying with the value of said symbol. Each symbol has different reflective and/or absorbing properties of the source light beam 105a.

Since the reading arrangement is adapted to measure only the characteristics of the illuminated section of the coding support, the capsule has to be rotated by the driving means until the source light beam has illuminated all the symbols comprised in the code. Typically, the speed for reading the code can be comprised between 0.1 and 2000 rpm.

In FIGS. 5a and 5b, the reading arrangement 100 comprises a light emitter 103 for emitting a source light beam 105a and a light receiver 102 for receiving a reflected light beam 105b.

Typically the light emitter 103 is a light-emitting diode or a laser diode, emitting an infrared light, and more particularly a light with a wavelength of 850 nm. Typically, the light receiver 103 is a photodiode, adapted to convert a received light beam into a current or voltage signal.

The reading arrangement 100 comprises also processing means 106 including a printed circuit board embedding a processor, sensor signal amplifier, signal filters and circuitry for coupling said processing means 106 to the light emitter 103, the light receiver 102 and to the control unit 9 of the machine.

The light emitter 103, the light receiver 102, and the processing means 106 are maintained in a fixed position by a support 101, rigidly fixed relatively to the machine frame. The reading arrangement 100 stays into its position during an extraction process and is not driven into rotation, contrary to the capsule holder 32.

In particular, the light emitter 103 is disposed so as the source light beam 105a is generally oriented along a line L crossing at a fixed point F the plane P comprising the receiving part 34 of the capsule holder 32, said plane P having a normal line N passing through the point F. The fixed point F determines an absolute position in space where the source light beams 105a is intended to hit a reflective surface: the position of the fixed point F remains unchanged when the capsule holder is rotated. The reading arrangement may comprise focusing means 104, using for example holes, lenses and/or prisms, to make the source light beam 105 converging more efficiently to the fixed point F of the lower surface of the lid of a capsule positioned into the capsule holder 32. In particular, the source light beam 105 may be focused so as to illuminate a disc centered sensibly on the fixed point F.

The reading arrangement 100 is configured so as the angle $\theta_E$ between the line L and the normal line N is comprised between 2° and 10°, and in particular between 4° and 5° as shown in FIG. 5a. As a consequence, when a reflecting surface is disposed at the point F, the reflected light beam 105b is generally oriented along a line L', crossing the fixed point F, the angle $\theta_R$ between the line L' and the normal line N being comprised between 2° and 10°, and in particular between 4° and 5° as shown in FIG. 2a. The light receiver 102 is disposed on the support 101 so as to gather at least partially the reflected light beam 105b, generally oriented along the line L'. The focusing means 104 may also be arranged to make the reflected light beam 105b concentrating more efficiently to the receiver 102. In the embodiment illustrated in FIG. 5a, 5b, the point F, the line L and the line L' are co-planar. In another embodiment, the point F, the line L and the line L' are not co-planar: for instance, the plane passing through the point F and the line F and the plane passing through the point F and the line L' are positioned at an angle of sensibly 90°, eliminating direct reflection and allowing a more robust reading system with less noise.

The capsule holder 32 is adapted to allow the partial transmission of the source light beam 105a along the line L up to the point F. For instance, the lateral wall forming the cylindrical or conical wide shaped cavity of the capsule holder is configured to be non-opaque to infra-red lights. Said lateral wall can be made of a plastic based material which is translucent to infra-red having entry surfaces allowing infra-red light to enter.

As a consequence, when a capsule is positioned in the capsule holder 32, the light beam 105a hits the bottom part of the rim of said capsule at point F, before forming the reflected light beam 105b. In this embodiment, the reflected light beam 105b passes through the wall of the capsule holder up to the receiver 102.

The section of the lower surface of the rim 23 of a capsule positioned into the capsule holder 32, illuminated at the point F by the source light beam 105, changes over the time, only when the capsule holder 32 is driven into rotation. So, a complete revolution of the capsule holder 32 is required for the source light beam 105 to illuminate the entire annular section of the lower surface of the rim.

The output signal may be computed or generated by measuring over the time the intensity of the reflected light beam, and possibly, by comparing its intensity to those of the source light beam. The output signal may be computed or generated by determining the variation over the time of the intensity of the reflected light beam.

Information on the capsule may for instance comprise a number coding for the recipe address which defines the location the recipe is stored in the machine, a recipe number coding for the type of recipe to be applied by the device for the capsule in the preparation and, optionally, specific parameters or information (e.g., product number, product names, etc.). The code on the capsule is preferably identified by the device during the compacting phase of coffee in the capsule.

Example of the Preliminary Beverage Preparation Steps:

For the rotation of the motor to start for enabling the reading of the code on the capsule and the compacting phase of coffee, a condition relative to a "ready mode" may have to be fulfilled beforehand. For instance, the temperature of the heater and collector should have reached temperature target values and, the pump and the rotational motor should be "off". The exit condition for the preliminary "ready mode" phase can be that the pushes user a start button. The next phase is so the "code reading and compacting" phase, for which the exit condition can be that the capsule type has been properly identified, preferably in addition to the condition the ready mode phase is still fulfilled. In the "code reading and compacting" phase, target rotational speed and acceleration/deceleration related parameters are preferably controlled.

The following examples present recipes, comprising sets of target values and conditions (C), that can be selected according to recognition information according to the invention.

Examples of Selectable Short Coffee Recipes:

|  | Ristretto 25 ml | Espresso #1 40 ml | Espresso #2 40 ml |
|---|---|---|---|
| Prewetting (incl. waiting time) | | | |
| Pump flow [ml/min] | 80 | 80 | 150 |
| Prewet volume [ml] | 10 | 10 | 10 |
| Waiting time [s] | 3 | 3 | 0 |
| Brewing phase 1 | | | |
| Motor acceleration startup [rpm/s] | 1000 | 1000 | 2000 |
| Rotational speed [rpm] | 3000 | 3000 | 5500 |
| Heater temperature [° C.] | 90 | 90 | 90 |
| Temperature collector [° C.] | 75 | 80 | 80 |
| Flow target [ml/min] | 80 | 80 | 80 |

-continued

|  | Ristretto 25 ml | Espresso #1 40 ml | Espresso #2 40 ml |
|---|---|---|---|
| Brewing phase 2 | | | |
| Transition volume [% of total volume] | 20 | 20 | 45 |
| Rotational speed [rpm] | 3000 | 4000 | 3000 |
| Heater temperature [° C.] | 90 | 90 | 90 |
| Temperature collector [° C.] | 75 | 80 | 80 |
| Flow target [ml/min] | 80 | 80 | 80 |
| Brewing phase 3 | | | |
| Transition volume [%] | 90 | 90 | 90 |
| Rotational speed [rpm] | 3000 | 3000 | 3000 |
| Heater temperature [° C.] | 80 | 80 | 80 |
| Temperature collector [° C.] | 70 | 70 | 70 |
| Flow target [ml/min] | 80 | 80 | 80 |
| Drying phase | | | |
| Minimum rotational speed [rpm] | 5000 | 5000 | 5000 |
| Duration [s] | 5 | 5 | 5 |

Examples of Selectable Long Coffee Recipes:

|  | Long coffee #1 230 ml | Long coffee #2 230 ml | Long coffee #3 400 ml |
|---|---|---|---|
| Prewetting (incl. waiting time) | | | |
| Pump flow [ml/min] | 80 | 80 | 150 |
| Prewet volume [ml] | 20 | 20 | 20 |
| Waiting time [s] | 0 | 0 | 0 |
| Brewing phase 1 | | | |
| Motor acceleration startup [rpm/s] | 1500 | 1500 | 2000 |
| Rotational speed [rpm] | 4500 | 3000 | 4500 |
| Heater temperature [° C.] | 80 | 80 | 80 |
| Temperature collector [° C.] | 60 | 60 | 60 |
| Flow target [ml/min] | 140 | 180 | 150 |
| Brewing phase 2 | | | |
| Transition volume [% of total volume] | 30 | 30 | 40 |
| Rotational speed [rpm] | 4500 | 6000 | 6000 |
| Heater temperature [° C.] | 80 | 80 | 80 |
| Temperature collector [° C.] | 60 | 60 | 60 |
| Flow target [ml/min] | 200 | 180 | 200 |
| Brewing phase 3 | | | |
| Transition volume [%] | 65 | 65 | 80 |
| Rotational speed [rpm] | 4500 | 3000 | 6000 |
| Heater temperature [° C.] | 80 | 80 | 70 |
| Temperature collector [° C.] | 70 | 70 | 60 |
| Flow target [ml/min] | 250 | 180 | 250 |
| Drying phase | | | |
| Minimum rotational speed [rpm] | 5000 | 5000 | 5000 |
| Duration [s] | 5 | 5 | 5 |

The invention claimed is:

1. A method for preparing a beverage by centrifugation of a capsule in a centrifuging brewing device of a beverage preparation system, the beverage preparation system comprising a heater, a pump, a motor, a recognition device, a database of recipes, and a controller adapted to control parameters of the centrifuging brewing device used during beverage preparation, the method comprising:

determining recognition information related to a type of the capsule inserted by a user in the centrifuging brewing device, and/or ingredients enclosed within the capsule;

selecting a recipe according to the recognition information, the recipe comprising at least two sets of target values for the parameters of the centrifuging brewing device, each set being associated to a specific condition, the recipe comprises at least two brewing phases comprising a first brewing phase and a second brewing phase defined respectively by a first set and a second set of the at least two sets of the target values, each set comprising a target temperature of the heater, a target flow rate of the pump, and a target rotational speed of the motor;

controlling the parameters of the centrifuging brewing device to reach a particular set of the target values from the at least two sets of the target values, the particular set is associated to the specific condition that is currently met; and injecting liquid in the capsule.

2. The method according to claim 1, wherein the specific condition is related to a volume of the beverage already prepared.

3. The method according to claim 1, wherein the at least two sets of the target values relate to at least two sequential brewing phases.

4. The method according to claim 1, wherein the specific condition is related to a time elapsed since beginning of the beverage preparation.

5. The method according to claim 1, wherein at least one of the target values for the parameters of the centrifuging brewing device is related to at least one parameter selected from the group consisting of: a volume of the liquid to introduce in the capsule during a specific phase of the beverage preparation, a flow rate of the liquid, a waiting time after the specific phase of the beverage preparation, an acceleration/deceleration function of a rotational speed of the centrifuging brewing unit during the specific phase of the beverage preparation or during transition between specific phases, an initial flow rate of the liquid introduced into the capsule during the specific phase of the beverage preparation or during the transition between the specific phases, an acceleration/deceleration of a flow rate of the liquid introduced into the capsule during the specific phase of the beverage preparation or during the transition between the specific phases, a temperature of the liquid during the specific phase of the beverage preparation, a target temperature of a collector of the centrifuging brewing device during the specific phase of the beverage preparation or a pre-wetting process, and a minimal rotational speed of the centrifuging brewing unit during the specific phase of the beverage preparation.

6. The method according to claim 1, wherein, during the determination of the recognition information, an identifier provided on the capsule inserted in the centrifuging brewing device is read, the identifier comprising information suitable for the controller to retrieve or determine a type of the capsule and/or the ingredients enclosed within the capsule and/or a type of the beverage to prepare with the capsule.

7. The method according to claim 6, wherein the identifier comprises a code provided on the capsule, the code being read in rotation after introduction of the capsule in the centrifuging brewing device.

8. The method according to claim 6, wherein the identifier comprises information related to a location where the recipe may be accessed, the controller being arranged to retrieve the recipe using the information related to a location during the selection of the recipe.

9. The method according to claim 6, wherein the identifier comprises at least part of information related to the recipe selected to be used with the capsule, the controller being arranged to use the information if the recipe cannot be retrieved and/or in place of corresponding parameters of the recipe.

10. The method according to claim 1, wherein the first set of the target values of the first brewing phase is associated to a condition that states that the first brewing phase is run under the first set, after the end of a pre-wetting phase or a pre-wetting waiting phase, until a volume of the beverage already prepared is greater than or equal to a first phase volume threshold of the liquid introduced into the capsule.

11. The method according to claim 1, wherein the second set of the target values of the second brewing phase is associated to a condition that states that the second brewing phase is run under the second set, after the end of the first brewing phase, until a volume of the beverage is already prepared is greater than or equal to a second phase volume threshold of the liquid introduced into the capsule.

12. The method according to claim 1, wherein the recipe comprises a third brewing phase defined by a third set of the target values and associated to a condition to be run after the end of the second brewing phase until a volume of the beverage already prepared is at least equal to a volume of beverage to prepare.

13. The method according to claim 12, wherein the beverage preparation system comprises a collector, and the third set of the target values comprises a target temperature of the collector.

14. The method according to claim 1, wherein the recipe comprises a set of parameters defining a drying phase associated to a condition that states that the drying phase starts under the set, after a last brewing phase, until drying is completed or a time is elapsed, the set comprising a target rotational speed of the motor, an OFF command for switching off the heater, and/or an OFF command for switching of the pump.

15. The method according to claim 1 comprising identifying the type of the capsule by the identifier provided on the capsule, wherein the recipe comprises an exit condition for the identification of the type of the capsule.

16. The method according to claim 1, wherein the beverage preparation system comprises a collector, and the at least two sets of the target values each further comprise a target temperature of the collector.

17. The method according to claim 1, wherein the at least two brewing phases are for the same beverage.

18. A centrifuging brewing device for preparing a beverage by centrifugation of a capsule, the centrifuging brewing device comprising:
a heater;
a pump;
a motor;
a rotary capsule holder of the centrifuging brewing device for holding the capsule;
a rotary drive to drive the capsule in rotational centrifugation;
an injection member for injecting liquid in the capsule, wherein the injection member is connected to the pump;
a controller connected to at least the rotary drive and the pump which is designed to vary a flow rate of the beverage and/or a volume of the beverage, the controller is arranged to execute steps of preparing the beverage; and
a recognition information member to determine the recognition information related to a type of the capsule inserted in the centrifuging brewing device; and a database of recipes, each recipe comprising at least a first brewing phase and a second brewing phase defined respectively by a first set and a second set of target values, each set comprising a target temperature of the heater, a target flow rate of the pump, and a target rotational speed of the motor.

* * * * *